INVENTOR.
WAYNE G. KLASING

INVENTOR.
WAYNE G. KLASING

INVENTOR.
WAYNE G. KLASING

United States Patent Office 3,425,294
Patented Feb. 4, 1969

3,425,294
NON-SPIN HAND BRAKE ASSEMBLY WITH QUICK RELEASE MECHANISM THEREFOR
Wayne G. Klasing, New Lenox, Ill., assignor to Klasing Hand Brake Co., Joliet, Ill., a corporation of Illinois
Filed Mar. 31, 1967, Ser. No. 627,402
U.S. Cl. 74—505     7 Claims
Int. Cl. G05g 1/08; F16d 13/76, 67/02

ABSTRACT OF THE DISCLOSURE

A hand brake assembly for railway cars in which a self-energizing friction clutch associated with the hand wheel shaft permits a graduated release of the car brakes and prevents spinning of the hand wheel. A manually operable quick release of the car brakes is made possible by the provision of a second manually shiftable jaw clutch in the power train between the hand wheel shaft and the chain winding drum.

---

The present invention relates generally to a non-spin hand brake assembly for a railway car and has particular reference to a quick release mechanism which forms a part of the associated hand brake assembly and obviates the necessity of reversely rotating the usual brake-applying hand wheel throughout the several complete revolutions that are ordinarily required of it where a standard or conventional hand brake assembly is concerned. The invention is illustrated and described herein in connection with a non-spin graduated release type of hand brake assembly such as is disclosed in U.S. Letters Patent No. 3,027,985, granted on Apr. 3, 1962 to Charles L. Klasing, Jr. and entitled "Sealed Non-spin Hand Brake Mechanism," and the principal object of the invention is to provide a hand brake assembly which is an improvement on that of said patent. The invention is, however, not limited to such use and, if desired, it may, by suitable modification, be employed in connection with a hand brake assembly having no provision for a graduated release. Irrespective, however, of the particular type of hand brake assembly to which the present quick release mechanism may be applied, the essential features thereof are at all times preserved.

Hand brake assemblies which are not equipped with non-spin features are essentially of the pawl and ratchet type wherein a trip lever serves to raise the pawl and release the ratchet whereupon the brake-applying hand wheel spins rapidly and violently in a brake-releasing direction. Non-spin hand brake assemblies of the graduated release type are essentially of the friction clutch type wherein small increments of reverse movement of the hand wheel serve to disengage the clutch and release the brake, but only to an extent commensurate with the degree of reverse movement of the hand wheel. In order fully to release the brake, several turns of the hand wheel in a reverse direction are required. There also is on the market a hand brake assembly which is of the non-spin type and wherein the quick release feature represents the only manner in which the brake may be released.

It is obvious that in the case of a hand brake assembly of the pawl and ratchet type, violent spinning of the hand wheel presents a hazard to the operating personnel and that in the case of a non-spin type hand brake assembly with a graduated release, considerable time is required to effect complete release of the brake. The disadvantage of such a slow brake release is apparent when it is considered that frequently a long train utilizes or requires only one or two brakemen in order completely to release all of the brakes on the train. In the case of a non-spin type hand brake assembly, the absence of a graduated release would be a decided disadvantage in that full control of the associated railway car could not be attained as, for example, when spotting the car on a siding.

The present invention is designed to overcome the above noted limitations that are attendant upon conventional hand brake assemblies which require large rotational hand wheel displacements for their release and, toward this end, the invention contemplates the provision of a novel quick release mechanism which is applicable to either type of hand brake assembly but which has been specifically designed for use in connection with a hand brake assembly of the non-spin graduated release type to the end that the hand brake assembly to which it is applied is possessed of dual release functions, namely, the conventional gradual release function and an additional quick release function whereby manual effort is eliminated and the various components or parts of the assembly are subjected to minimum wear.

The quick release mechanism of the present invention is so designed that spring pressure is effective to disable the mechanism and maintain the hand wheel potentially effective to apply the brake at such time as the hand wheel may be turned in a brake-applying direction. However, as a precautionary measure, and in the event that for any reason whatsoever, as, for example, failure of the spring or sticking of the parts due to the presence of foreign material in the mechanism, if the parts should fail to yield to the pressure of the spring, then normal positioning of a control lever that is associated with the quick release mechanism will serve positively to restore the parts to their normal brake-applying position.

The provision of a hand brake assembly employing a quick release mechanism of the character briefly outlined above constitutes the principal object of the invention. Other objects of the invention and the various advantages of the improved quick release mechanism will become readily apparent as the following description or specification ensues.

The invention consists of the novel construction, combination, and arrangement of parts as shown in the accompanying five sheets of drawings forming a part of this specification.

Figure 7:
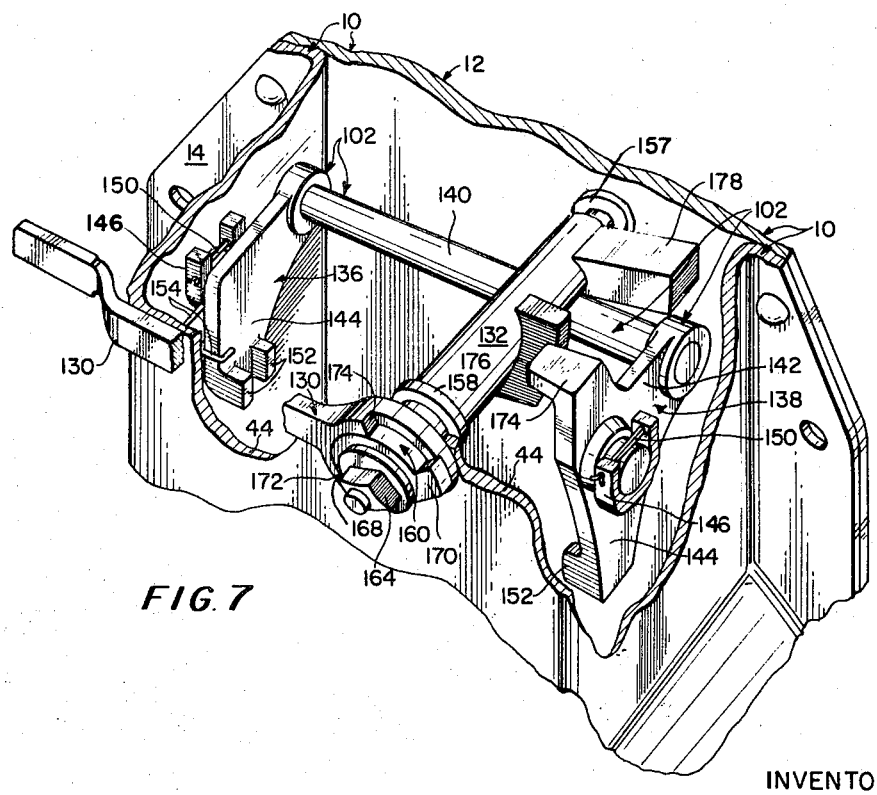
Figure 8:
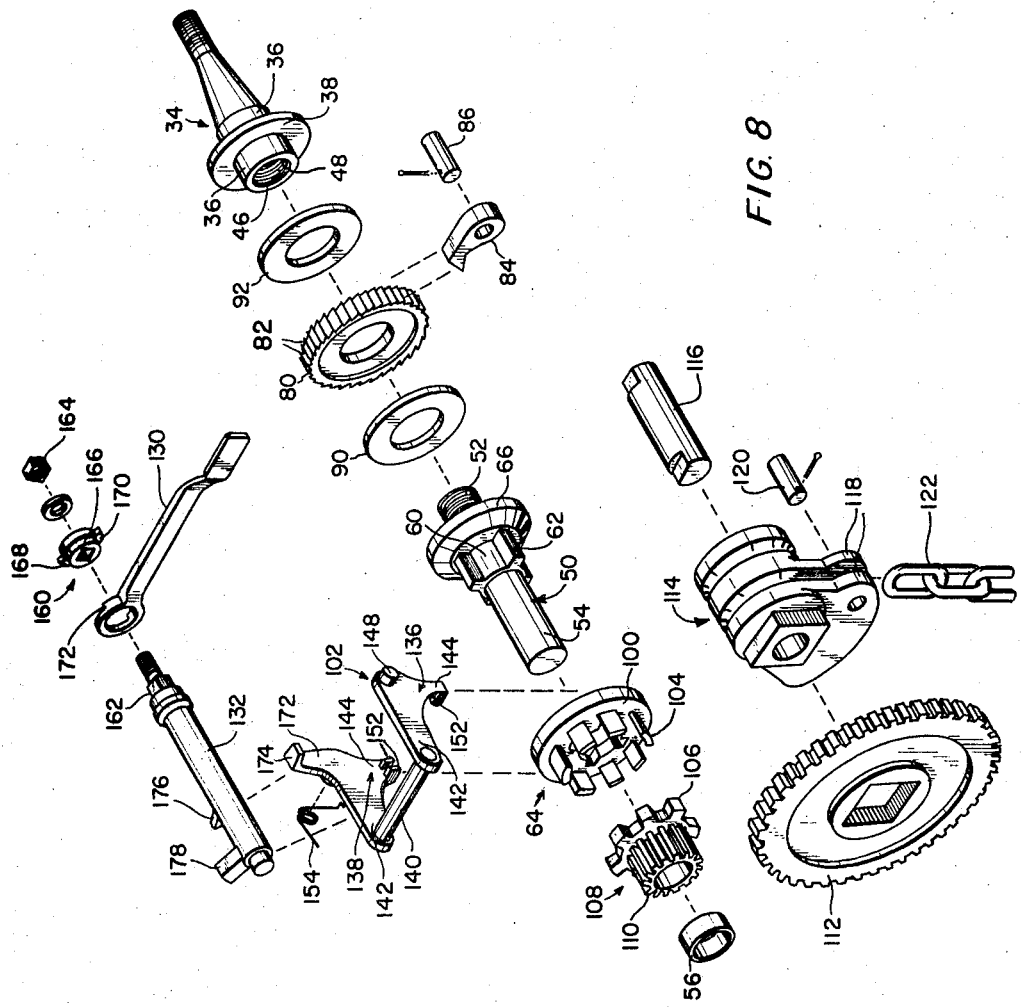

FIG. 7 is a fragmentary perspective view of the improved hand brake assembly showing only such parts as are associated with the quick release mechanism, these parts being shown in their inoperative position wherein the brake is conditioned for brake application; and FIG. 8 is an exploded perspective view illustrating the positional relationship of all of the relatively movable parts of the hand brake assembly, the hand brake housing being omitted from this view.

Figure 1:
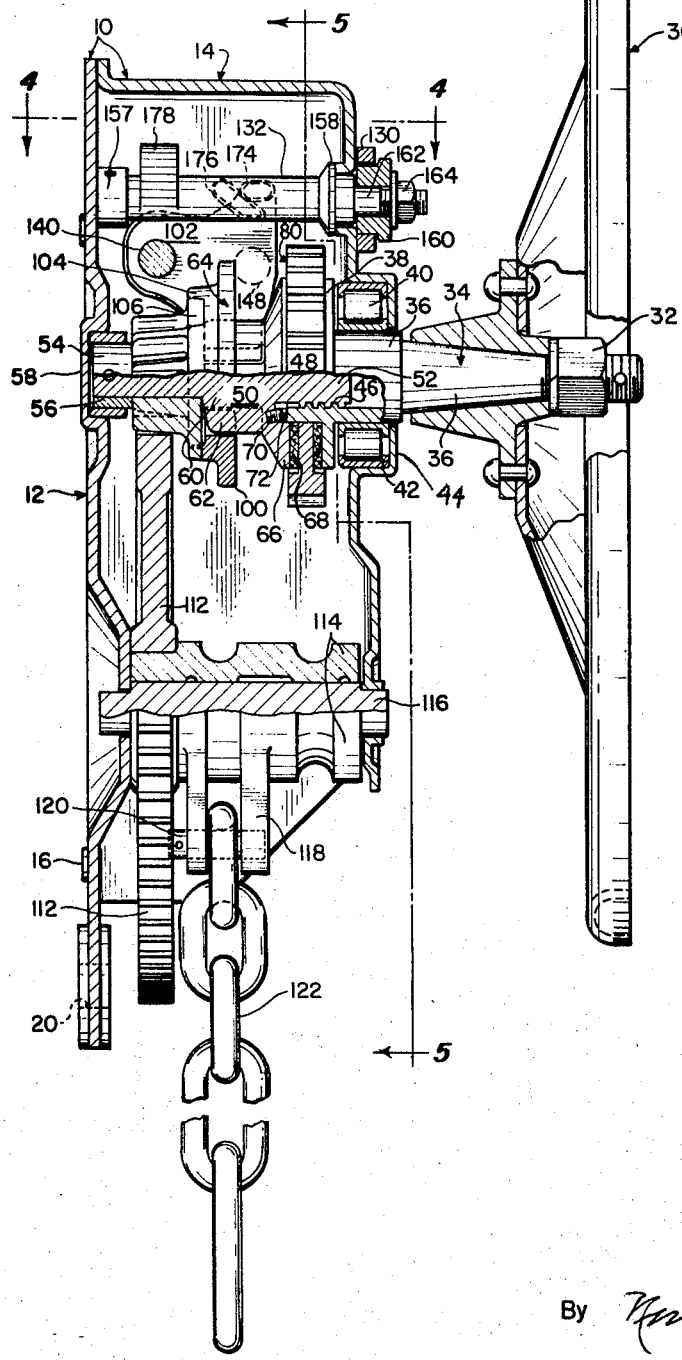
FIG. 1 is a vertical sectional view taken substantially centrally, longitudinally and vertically through a hand brake assembly embodying the quick release mechanism of the present invention, the parts being shown in the position which they assume when the mechanism is inoperative and the assembly as a whole is conditioned for brake application.

Referring now to the drawings and in particular to FIG. 1, the quick release mechanism of the present invention is shown as being operatively incorporated in a non-spin graduate release type of hand brake assembly like that shown and described in aforementioned Patent No. 3,027,985. The assembly involves in its general organization a two-piece housing 10 including a rear or base member 12 and a front or cover member 14. These two housing members 12 and 14 are adapted to be secured together by rivets 16 or other fastening devices. The base member 12 of the housing is in the form of a generally flat plate while the cover member 14 is of cup-shape configuration and is provided with an outwardly extending flange 18 through which the rivets 16 extend. Bolt holes 20 are provided in the corner portions of the base member 12 in order that the entire hand brake assembly may be bolted to an end wall of a railway car (not shown) in the usual manner of attachment.

Figure 5:
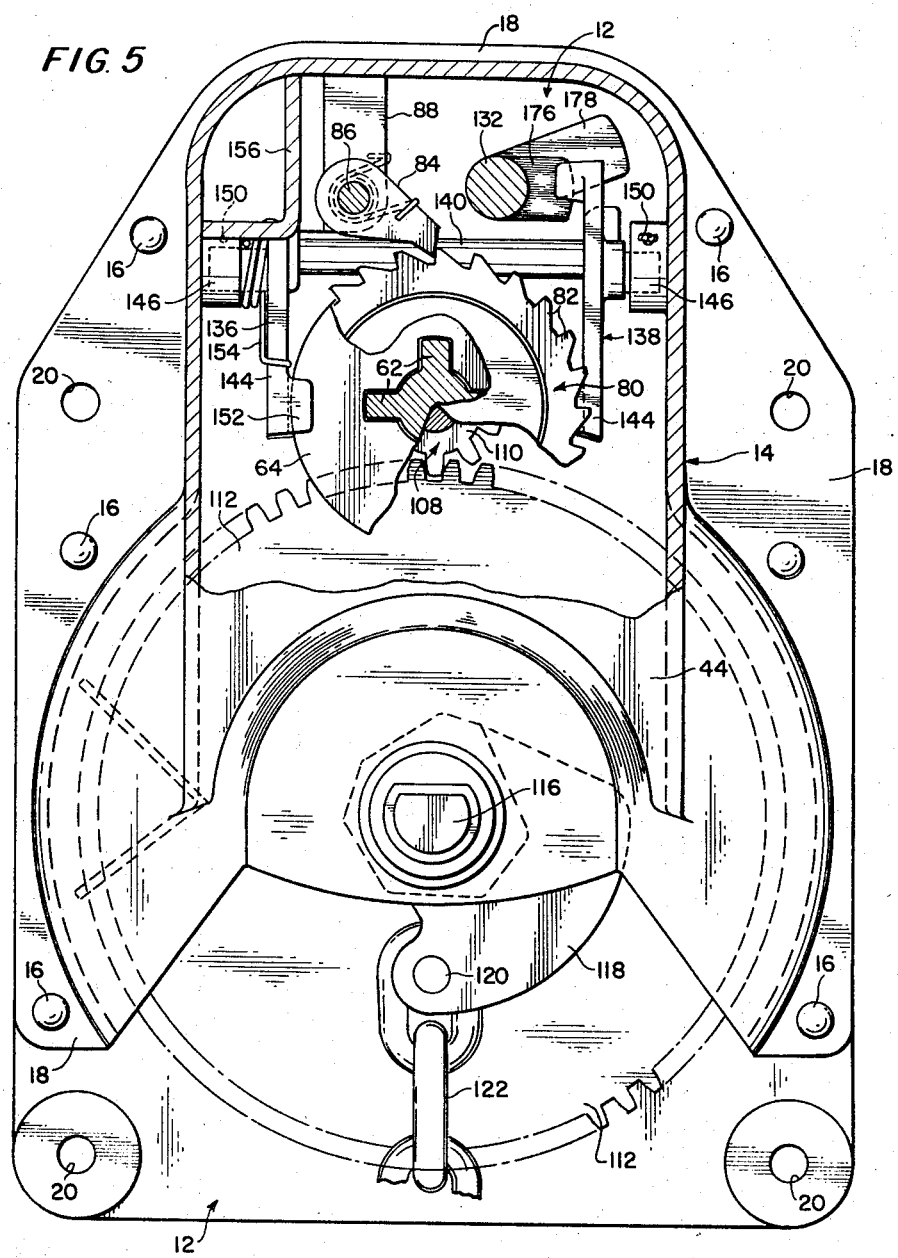
FIG. 5 is a vertical sectional view taken substantially on the line 5—5 of FIG. 1, portions of a particular clutch plate being broken away in the interests of clarity.

The hand brake assembly also includes a conventional hand wheel 30 which is affixed by means of a nut 32 to the front or exposed end of a horizontally extending, rotatably operating or hand wheel shaft 34. The latter extends through an opening in the cover member 14 of the two-piece housing 10 and is provided on the rear portion thereof with an enlarged hub portion 36 from the rear end of which there extends a radial clutch reaction flange 38 of circular configuration. The hub portion 36 of the shaft 34 is journalled in an anti-friction roller bearing assembly 40 which is nested within a circular recess 42 on the inside of the front wall 44 of the cover member 14 of the housing 10. The rear or inner end of the hub portion 36 of the shaft 34 is formed with a relatively deep, centrally located, cylindrical socket 46 (see FIGS. 2 and 8). Such socket has a threaded section 48 near its rim portion. A horizontal clutch shaft 50 is positioned in the interior of the housing 10 in coaxial relation with the shaft 34 and embodies at its front end a reduced, externally threaded pilot stem 52 which extends into the socket 46 and is threadedly received by the threaded section 48 of the socket 46 in the rear end of the hub portion 36 of the shaft 34. The rear end region of the clutch shaft 50 is cylindrical and constitutes a bearing section 54 which is rotatably supported in a cylindrical bushing 56. The latter is fixedly mounted in a cylindrical recess 58 in the upper portion of the base member 12 of the housing 10. The enlarged medial region 60 of the clutch shaft 50 constitutes a slide section and it may be of any desired non-circular configuration, but in the illustrated form of the invention, it is shown as being generally of star shape in cross section so as to provide a series of four longitudinally extending, laterally and equidistantly spaced splines 62 (see FIGS. 5 and 8) which cooperate with a shiftable clutch collar 64 in a manner and for a purpose that will be described presently.

Immediately forwards of the enlarged medial region 60 of the clutch shaft 50 there is provided a circular radial flange 66 which is formed as an integral part of the clutch shaft and has a forwardly facing clutch face 68. A stop pin 70 is threadedly received in an internally threaded socket in the flange 66 and cooperates with an abutment shoulder 72 on the rim of the socket 46 in the rear end of the hub portion 36 of the shaft 34 and limits the extent of relative turning movement between the two shafts 34 and 50 for a purpose that also will be made clear presently.

The hub portion 36 of the operating or hand wheel shaft 34 serves rotatably to support thereon a ratchet wheel 80 having ratchet teeth 82. The latter are designed for cooperation with a pivoted spring-pressed pawl 84 (see FIGS. 5 and 6) which is mounted on a horizontal pin 86. Such pin is supported by a lug 88 on the top portion of the cover member 14.

Figure 2:
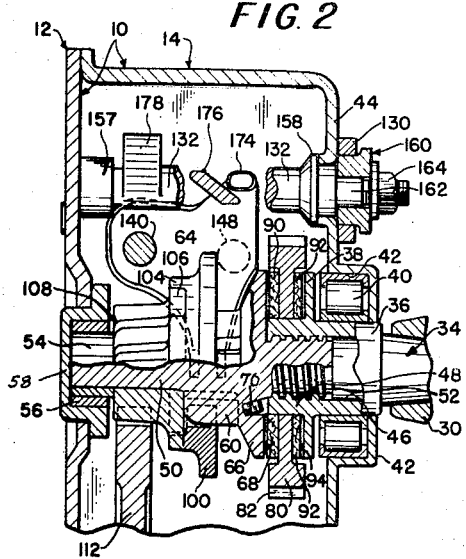
FIG. 2 is a fragmentary sectional view of a portion of the structure of FIG. 1 and in the vicinity of the quick release mechanism, certain parts being broken away in order more clearly to reveal the nature of the invention.
Figure 3:
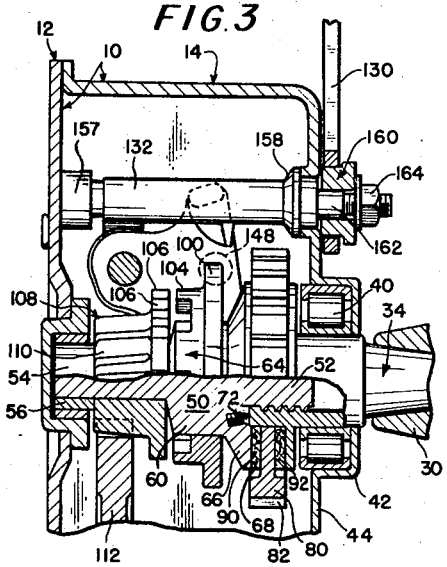
FIG. 3 is a fragmentary sectional view similar to FIG. 2 but showing the parts in the position which they assume when the quick release mechanism is operative to release the brake.

Interposed between the forwardly facing clutch face 68 of the circular radial flange 66 and the rear face of the ratchet wheel 80 is a friction clutch disk 90 (see FIGS. 2 and 3). A similar friction clutch disk 92 is interposed between the rear face 94 of the radial clutch reaction flange 38 and the front face of the ratchet wheel 80. The two friction clutch disks 90 and 92, as well as the ratchet wheel 80, are loosely received over the rear end of the enlarged hub portion 36 of the operating or hand wheel shaft 34. The two disks and the ratchet wheel are thus capable of limited axial movement on said hub portion 36 so that when the hand wheel 30 is manually rotated in a clockwise direction, as would be viewed from the right-hand side of FIG. 1, to increase the extent of threaded engagement between the mating threaded end portions of the two shafts 34 and 50, the two friction clutch disks and the interposed ratchet wheel will be compressed as a unit between the forwardly facing clutch face 68 of the radial flange 66 and the rear face 94 of the radial clutch reaction flange 38 in such a manner that the various friction surfaces that are afforded on the opposite sides of the friction clutch disks 90 and 92 and on the oposite sides of the ratchet wheel 80 will be so locked together that the entire clutch assembly including the operating or hand wheel shaft 34 and the clutch shaft 50 will become locked up and thus rotate bodily as a unit during application of the hand brake.

The previously mentioned clutch collar 64 is capable of limited longitudinal sliding movement on the enlarged medial region 60 (see FIGS. 1, 2, 3, 5 and 8) of the clutch shaft 50. Such clutch collar is formed with a smooth circular radial flange 100 by means of which it may be shifted bodily along the axis of the clutch shaft 50 under the control of a pivoted yoke assembly 102. The nature of said yoke assembly will be made clear subsequently. The clutch collar 64 is also formed with an annular series of rearwardly projecting clutch teeth 104 which are best illustrated in (FIGS. 3 and 6) and are designed for cooperation with an annular series of mating radial clutch teeth 106 on a combined pinion and clutch wheel 108. The latter is rotatably carried on the cylindrical rear end region or bearing section 54 of the clutch shaft 50.

The combined pinion and clutch wheel 108 is formed with a pinion section 110 of relatively large main winding or spur gear 112 which is mounted on, and rotatable bodily with a drum member 114 (see FIGS. 1 and 8). Such drum member is, in turn, mounted on a horizontal drum shaft 116 which is disposed in the interior of the two-piece housing 10 and is supported at its ends in the lower regions of the base member 12 and the cover member 14 of said housing. The drum member 114 is provided with an integral, radially extending, bifurcated crank arm 118. The latter carries at its distal end a horizontal crank pin 120 which passes through the uppermost link of a tensioning chain 122. Such chain leads to the brake shoe mcehanism (not shown) with which the present hand brake assembly is associated.

The arrangement of parts thus far described is similar in many respects to the hand brake assembly of aforementioned U.S. Patent No. 3,027,985 with the exception of the existence of the clutch collar 64 which constitutes the principal clutch element of the novel quick release mechanism constituting the present invention. When this clutch collar is maintained in effective clutched engagement with the combined pinion and clutch wheel 108, the hand brake assembly operates in a manner substantially identical with the hand brake assembly of said patent and preserves the gradual or graduated release feature whereby the tension in the chain 120 may be released in small increments without the application of spinning torque to the hand wheel 30. Briefly, when it is desired to apply the railway car brakes with which the hand brake assembly is associated, the hand wheel 30 is rotated manually in a clockwise direction as viewed from the right-hand side of FIG. 1. Inasmuch as the chain 122 is at that time unwound from the drum member 114 and is, therefore, slack, the clutch assembly, including the ratchet wheel 80 and the friction clutch disks 90 and 92, is disengaged and the clutch shaft 50 is backed off, so to speak, on the internally threaded section 48 of the socket in the inner or rear end of the operating or hand wheel shaft 34 so that the ratchet wheel 80 is unclutched from the shaft 34. As the hand wheel 30, and consequently, the shaft 34, is gradually turned in such clockwise direction, the entire clutch shaft 50 is caused to move forwardly, i.e., to the right as viewed in FIGS. 1 to 3, inclusive, and this is due to the fact that the rotational movement of the pinion section 110 is restricted by the inertia of the spur gear 112, the drum member 114 and the chain 122, as well as by the gravitational and tensional drag which is applied to the chain by the railway car brake devices. Upon such threaded movement of the clutch shaft 50, the radial flange 66 will cooperate with the opposing radial flange 38 on the operating or hand wheel shaft 34 to lock up the entire clutch mechanism (elements 80, 90, 92) in the manner previously described so that the hand wheel shaft 34 will rotate in unison with the clutch shaft 50 and establish a rigid power train extending from the hand wheel 30, through the hand wheel shaft 34, said clutch mechanism 80, 90, 92, the clutch shaft 50, the clutch collar 64, the pinion 110, the spur gear 112, the drum 114 and the chain 122. As the drum 114 thus rotates under the influence of the hand wheel 30, the crank pin 120 will move upwardly and cause the chain to commence its winding operation upon the drum, thus gradually applying the railway car brakes. At such time as the brake becomes set, the counter-torque which is applied to the pinion section 110 of the combined pinion and clutch wheel 108 has a tendency to impart reverse rotation to this pinion section. Such a tendency is effective to thread the forward end of the clutch shaft 50 into the internally threaded socket 46 in the rear end of the operating or hand wheel shaft 34 and maintain the clutch assembly tightly locked up so that the pawl 86 will be effective against the entire clutch assembly and not merely against the ratchet wheel 80. As a consequence, the brake will not be released even though the hand wheel 30 may be released by the operator.

Gradual release of the brake may be effected by turning the hand wheel 30 in a counterclockwise direction as viewed from the right-hand side of FIG. 1 throughout any desired small increment of rotational motion. Upon initial counterclockwise movement of the hand wheel 30, the operating or hand wheel shaft 34 and the clutch shaft 50 will turn in unison due to the fact that the clutch assembly is at this time locked up. However, as soon as the influence of the pawl 86, acting upon the ratchet wheel 80, terminates the counterclockwise motion of the latter, continued counterclockwise movement of the hand wheel 30 will cause the mating threads on the two shafts 34 and 50 to be turned relatively to each other so as to back off the clutch shaft 50 (so to speak) and relieve the pressure of the friction clutch disks 90 and 92 to such an extent that the clutch assembly is no longer engaged but is partially released. Such partial disengagement of the clutch parts will continue only during actual application of counterclockwise torque to the hand wheel 30 and immediately upon cessation of the application of such torque, the countertorque which is applied through the power train leading from the chain 122 to the clutch shaft 50 will again lock the clutch parts against relative rotation. Such a clutch arrangement is commonly referred to as a self-energizing friction clutch.

As previously indicated, the existence of the clutch collar 64 and its association with the combined pinion and clutch wheel 108, together with a manual control mechanism for shifting the clutch wheel 108 which will subsequently be described in detail, constitutes a novel quick release mechanism whereby the railway car brakes may be quickly and fully released by "dumping" the tension in the chain 122 without requiring any motion of the hand wheel 30 whatsoever.

The control mechanism for shifting the clutch collar 64 between its position of clutched engagement with the combined pinion and clutch wheel 108 and its position of release therefrom is best illustrated in FIGS. 7 and 8, although portions of such control mechanism also appear in all of the other views of the drawings. The clutch collar 64 is shiftable under the control of a lever 130 which operates through a horizontal cam shaft 132 to control the rocking movements of the previously mentioned pivoted yoke assembly 102 (see particularly FIG. 8) which, in turn, operates in the manner of a dual shifting fork to engage the radial flange 100 of the clutch collar 64 and shift the latter bodily into and out of clutching engagement with the combined pinion and clutch wheel 108. The cam shaft 132 is disposed in the upper portion of the interior of the two-piece housing 10. It extends in parallel relation with the shafts 34 and 50 and has its ends suitably journalled on the base and cover members of the housing. The front end of the cam shaft extends through the front wall 44 of the cover member 14 and has the proximal end of the lever 130 indirectly connected thereto as described in detail hereafter.

Figure 4:
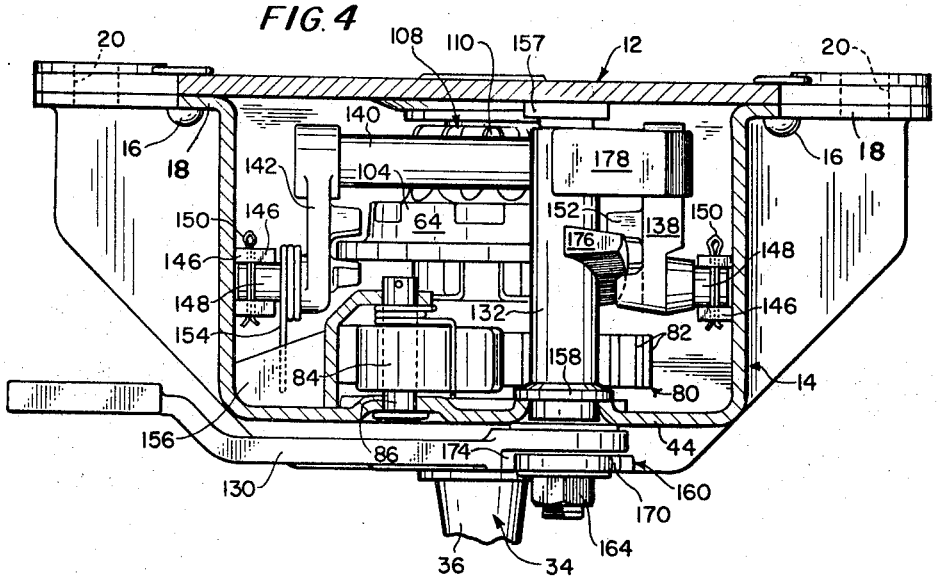
FIG. 4 is a horizontal sectional view taken substantially on the line 4—4 of FIG. 1.

More specifically, the pivoted yoke assembly 102 is comprised of a pair of approximately complementary fork members 136 and 138, the two fork members being rigidly connected together by a horizontal connector bar 140. Each fork member is generally of obtuse angle design and, in effect, constitutes a bell crank lever having a substantially horizontal long arm 142 and a depending short arm 144. The two fork members 136 and 138 are pivoted to the opposite side walls of the cover member 14 of the housing near the junctures between the long arms 142 and the short arms 144, the pivotal connections being in the form of cradle supports 146 therein (see FIGS. 4 and 8) which receive trunnions 148 and maintain them captured by means of horizontal cotter pins 150. The connector bar 140 extends between, and has its ends fixedly connected to, the distal ends of the long arms 144 of the fork members 136 and 138. The lower end of each short arm 144 is formed with a pair of spaced apart lugs 152 which project inwardly therefrom and straddle the peripheral region of the radial flange 100 of the clutch collar 64, these lugs thus constituting, in effect, shift forks by means of which longitudinal shifting motion may be applied to said clutch collar 64 during rocking movement of the pivoted yoke assembly 102. A helical spring 154 (see FIG. 5) encircles one of the trunnions 148 and the ends of this spring find reaction support, respectively, against the adjacent short arm 144 and against a web 156 (see FIGS. 4 and 5) in such a manner as yieldingly to bias the entire yoke assembly 102 in a direction tending to force the clutch collar 64 to a position of clutching engagement with the combined pinion and clutch wheel 108.

The previously mentioned cam shaft 132 is disposed a slight distance above the level of the trunnions 148 and it is disposed adjacent to and cooperates with the fork member 138 to apply rocking motion to the pivoted yoke assembly 102 as a whole in a manner that will become clear presently. The rear end of the horizontal cam shaft 132 is mounted for rocking movement in a circular boss 157 on the wall 44 of the housing section 12; while the front end of the cam shaft projects through the front wall 44 of the cover member 14 as shown in FIGS. 1, 2, 3 and 7, and is prevented from axial shifting by means of an integral, radially extending flange 158 adjacent to the inside of the front wall and an abutment sleeve 160 adjacent to the outside of said front wall. The cradle support 157 is suitably mounted on the front face of the base member 12 of the housing 10. The abutment sleeve 160 seats on a squared portion 162 at the front end of the cam shaft 132 and is held on the shaft by a nut 164. The lever 130 has its proximal end rotatably mounted on a cylindrical portion 166 (see FIG. 8) of the abutment sleeve 160 and a lost motion connection between the sleeve and the lever enables the lever to swing in idle fashion and without function between two extreme positions as determined by the provision of a pair of spaced stop lugs 168 and 170 on the abutment sleeve and a pair of spaced apart abutment shoulders 172 and 174 on the inner or proximate end of the lever. During such idle motion of the lever 130, rocking movement of the cam shaft 132 is not affected. However, when the abutment shoulder 172 on the proximal end of the lever engages the stop lugs 168 on the abutment sleeve 160, further depression of the lever as viewed in FIG. 7 will cause counterclockwise rocking movement of the cam shaft. Similarly, when the abutment shoulder 174 on the proximal end of the lever 130 engages the stop lug 170 on the abutment sleeve 160, further swinging movement of the lever in a clockwise direction will effect clockwise rocking movement of the cam shaft.

The fork member 138 of the pivoted yoke assembly 134 differs from the fork member 136 in that it is provided with an upstanding arm 172 (see FIGS. 7 and 8) from which there projects laterally in a forward direction a lug 174 which is disposed in the immediate vicinity of the cam shaft 132. This lug is designed for cooperation with a spiral lift cam 176 which is formed on the cam shaft in the medial or central region of the latter. A second cam (hereinafter referred to as a hold-down cam 178) is formed on the cam shaft 132 adjacent to the rear end of the latter and cooperates with the distal end region of the long arm 142 of the fork member 138.

Figure 6:
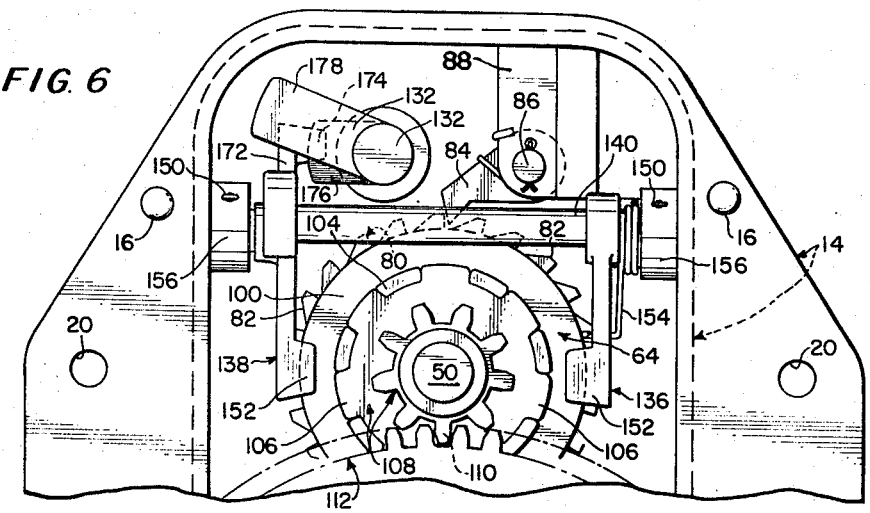
FIG. 6 is a fragmentary rear view of the hand brake assembly with the base member removed in order more clearly to reveal the nature of the invention.

The spiral lift cam 176 normally underlies the lug 174 and is so designed that when the lever 130 is in an approximately horizontal position as shown in FIG. 7 with the stop shoulder 172 in engagement with the stop lug 168, said spiral lift cam 176 bears upwardly against the underneath side of the lug 174 on the fork member 138 and the gravitational weight of the lever assists the action of the spring 154 in maintaining the yoke assembly 102 in its position of clutch engagement between the shiftable clutch collar 64 and the combined pinion and clutch wheel 108. At this time, the hold-down lug 178 is out of contact with the distal end region of the long arm 142 of the fork member 138 of the yoke assembly 102 as shown in FIGS. 6 and 7. When the lever 130 is in its approximately vertical position with the abutment shoulder 174 in engagement with the stop lug 170, the spiral lift cam 176 is out of contact with the lug 174 on the fork member 138, thus affording clearance for swinging movement of the entire yoke assembly 102 against the action of the spring 154 to a position wherein the clutch collar 64 and the combined pinion and clutch wheel 108 are out of meshing engagement with each other. This movement of the yoke assembly 102 is intiated by the hold-down cam 178 which, during swinging movement of the lever 130, engages the distal end region of the long arm 142 of the fork member 138 and depresses the arm, thus swinging the short arm 144 in a forward direction and causing the circular radial flange 100 of the clutch collar 64 which is confined between the two lugs 152 to be shifted forwardly thereby to shift the entire clutch collar out of meshing engagement with the combined pinion and clutch wheel 108.

From the above description, it will be apparent that in the operation of the herein described hand brake assembly the control lever 130 will normally be maintained in the horizontal position in which it is shown in FIGS. 1, 2, 4 and 7, so that its gravitational weight will assist the spring 154 in holding the aforementioned quick release clutch mechanism, including the two clutch parts 64 and 108, in meshing engagement. As has been previously stated, with these two clutch parts thus meshing with each other, normal hand wheel operation, either for the purpose of tightening the railway car brakes or of effecting a gradual release thereof in the manner previously set forth in detail, is made possible. When it is desired to effect a quick release of the tension in the chain 120, it is merely necessary for the brakeman or other operator to shift the control lever 130 from its approximately horizontal position to the approximately vertical position in which it is shown in FIG. 3. Such movement of the lever will be ineffective during a major portion of its angular sweep during which time the gap between the stop shoulder 174 and the stop lug 170 will progressively become closed. As soon as the stop shoulder 174 engages the stop lug 170, angular turning movement of the abutment sleeve 160 will be initiated with a consequent rotation of the cam shaft 132 in a direction to cause cooperation between this cam shaft and the yoke assembly 102 in the manner previously described to swing the two short arms 144 of the fork members 136 and 138 forwardly and thus shift the clutch collar 64 out of meshing engagement with the combined pinion and clutch wheel 108. Since the clutch wheel 108 is freely rotatable upon the cylindrical rear end region 54 of the clutch shaft 50, release of the clutch wheel by the clutch collar 64 enables the tension in the chain 122 to be dissipated through the drum member 114 and the spur gear 112 to the pinion section 110 of the combined pinion and clutch wheel 108. Said combined pinion and clutch wheel will thus spin idly until such time as all of the tension in the chain has been relieved. Meanwhile, the hand wheel 30 will remain stationary since the power train leading thereto from the chain has been broken by the existence of the freely rotatable combined pinion and clutch wheel 108.

From the above description, it is believed that the construction, operation, and many advantages of the herein described hand brake assembly will be apparent without further description. It is to be further noted, however, that with the control lever 130 in its substantially vertical position of brake release, manipulation of the hand wheel 30 in either direction of turning movement will be without function since no motion can be transmitted from the operating or hand wheel shaft 34 through the pinion section 110 of the combined pinion and clutch wheel 108 due to the fact that said combined pinion and clutch wheel 108 and the clutch collar 64 are not in meshing engagement with each other and the power train leading from the hand wheel 30 to the chain 130 is thus broken.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by Letters Patent is:

1. In a hand brake structure, the combination with a rotary chain-winding drum having a main winding gear thereon, of an axially shiftable clutch shaft having a cylindrical bearing section and a noncylindrical slide section, a pinion freely rotatable on said bearing section and in mesh with said main winding gear, a clutch collar slidable on said slide section into and out of clutching engagement with the pinion and rotatable in unison with the clutch shaft, an axially fixed hand wheel shaft coaxial with said clutch shaft, one of said shafts being formed with a threaded socket therein, the adjacent end of the other shaft being threadedly received in said socket for limited axial shifting movement of the clutch shaft in opposite directions upon relative turning movement between the two shafts in opposite directions respectively, a clutch face on said clutch shaft, an opposing clutch face on said hand wheel shaft, a ratchet wheel freely rotatable on said hand wheel shaft and disposed between said clutch face, a pawl cooperating with said ratchet wheel for preventing rotation of the latter in one direction, said clutch shaft being movable between a position of clutch engagement wherein said ratchet wheel is clamped between said clutch faces and a position of clutch release wherein said ratchet wheel is released by said clutch faces, the extent of threaded engagement between said threaded socket on the one shaft and the threaded end of the other shaft being such that upon initial turning movement of the hand wheel shaft in a drum-winding direction the clutch shaft will be shifted to its position of clutch engagement, after which continued rotation of the hand wheel shaft in said direction will effect continued rotation of the clutch shaft in the same direction, and that upon turning movement of the hand wheel shaft in the reverse direction the clutch faces will release said ratchet wheel and effect a graduated reverse rotation of the clutch shaft in a drum unwinding direction; and manual means for shifting the clutch collar into and out of clutching engagement with said pinion.

2. In a hand brake assembly, the combination set forth in claim 1 and wherein said threaded socket is formed in one end of the hand wheel shaft.

3. In a hand brake assembly, the combination set forth in claim 1 and wherein said manual means for shifting said clutch collar into and out of clutching engagement with said pinion comprises a shift fork mounted for swinging movement in a plane parallel to the axis of said clutch collar and engageable with the collar for moving the same in opposite directions, a cam shaft in the vicinity of said shift fork, a first cam on said cam shaft and capable during rotation of the cam shaft in one direction of engaging and swinging the shift fork in a direction to effect clutch collar and pinion engagement, and a second cam on said cam shaft and effective during rotation of the cam shaft in the opposite direction to engage and swing the shift fork in a direction to effect clutch collar and pinion disengagement, and a manually operable lever on said cam shaft for selectively rotating the latter in opposite directions.

4. In a hand brake assembly, the combination set forth in claim 3 and including, additionally, spring means yieldingly biasing the shift fork in a direction to effect clutch collar and pinion engagement.

5. In a hand brake assembly, the combination set forth in claim 1 and wherein said clutch collar is provided with a radial flange thereon, and said manual means for shifting said clutch collar into and out of clutching engagement with said pinion comprises a yoke mounted for swinging movement about an axis normal to a plane with which the axis of the clutch collar is coincident, said yoke including a pair of shift forks which straddle the clutch collar and a rigid connector bar extending therebetween, a pair of lugs on each of said shift forks and straddling said radial flange and engageable therewith for shifting the clutch collar in opposite direction upon swinging movement of the yoke in opposite directions respectively, spring means yieldingly biasing said yoke in one direction to effect clutch collar and pinion engagement, and manually operable cam means engageable with said yoke for shifting the latter against the action of said spring means in the opposite direction to effect clutch collar and pinion disengagement.

6. In a hand brake assembly, the combination set forth in claim 5 and wherein said manually operable cam means comprises a cam shaft in the vicinity of said yoke, and a cam on said cam shaft and engageable with one of said shift forks during rotation of the cam shaft in one direction to swing said yoke in said opposite direction.

7. In a hand brake assembly, the combination set forth in claim 6 and including, additionally, a second cam on said cam shaft and capable during reverse rotation of the cam shaft of engaging said one shift fork to swing the yoke in said one direction.

References Cited

UNITED STATES PATENTS

| | | | |
|---|---|---|---|
| 2,426,023 | 8/1947 | Jeppesen et al. | 192—67 |
| 2,762,225 | 9/1956 | Robertson | 74—505 X |
| 2,841,454 | 7/1958 | Cheramie | 192—67 X |
| 2,954,107 | 9/1960 | Klasing | 192—16 |
| 3,027,985 | 4/1962 | Klasing | 192—16 |
| 3,216,278 | 11/1965 | Plume | 192—67 X |

FOREIGN PATENTS 491,665  3/1953  Canada.

LLOYD L. KING, *Primary Examiner.*

WILLIAM E. WAYNER, *Assistant Examiner.*

U.S. Cl. X.R.

192—16